US010388275B2

United States Patent
Kim et al.

(10) Patent No.: US 10,388,275 B2
(45) Date of Patent: Aug. 20, 2019

(54) METHOD AND APPARATUS FOR IMPROVING SPONTANEOUS SPEECH RECOGNITION PERFORMANCE

(71) Applicant: Electronics and Telecommunications Research Institute, Daejeon (KR)

(72) Inventors: Hyun Woo Kim, Daejeon (KR); Ho Young Jung, Daejeon (KR); Jeon Gue Park, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 21 days.

(21) Appl. No.: 15/697,923

(22) Filed: Sep. 7, 2017

(65) Prior Publication Data
US 2018/0247642 A1    Aug. 30, 2018

(30) Foreign Application Priority Data
Feb. 27, 2017    (KR) .......................... 10-2017-0025397

(51) Int. Cl.
*G10L 15/16*    (2006.01)
*G06N 3/08*    (2006.01)
(Continued)

(52) U.S. Cl.
CPC ................ *G10L 15/16* (2013.01); *G06N 3/08* (2013.01); *G10L 15/04* (2013.01); *G10L 15/02* (2013.01);
(Continued)

(58) Field of Classification Search
None
See application file for complete search history.

(56) References Cited

U.S. PATENT DOCUMENTS 4,820,059 A * 4/1989 Miller .................... G10L 15/04
704/238
5,381,512 A * 1/1995 Holton ................... G10L 15/02
704/200.1
(Continued)

FOREIGN PATENT DOCUMENTS

| JP | 2011-257643 | 12/2011 |
| JP | 2016-128935 | 7/2016 |
| KR | 10-2016-0032536 | 3/2016 |

OTHER PUBLICATIONS

Tomas Dekens et al., "Speech Rate Determination by Vowel Detection on the Modulated Energy Envelope", EUSIPCO 2014; Sep. 1-5, 2014; pp. 1252-1256.

*Primary Examiner* — Neeraj Sharma
(74) *Attorney, Agent, or Firm* — Kile Park Reed & Houtteman PLLC (57) ABSTRACT

The present invention relates to a method and apparatus for improving spontaneous speech recognition performance. The present invention is directed to providing a method and apparatus for improving spontaneous speech recognition performance by extracting a phase feature as well as a magnitude feature of a voice signal transformed to the frequency domain, detecting a syllabic nucleus on the basis of a deep neural network using a multi-frame output, determining a speaking rate by dividing the number of syllabic nuclei by a voice section interval detected by a voice detector, calculating a length variation or an overlap factor according to the speaking rate, and performing cepstrum length normalization or time scale modification with a voice length appropriate for an acoustic model.

16 Claims, 6 Drawing Sheets

(51) Int. Cl.
  *G10L 15/04*  (2013.01)
  *G10L 15/02*  (2006.01)
  *G10L 21/04*  (2013.01)
  *G10L 25/84*  (2013.01)

(52) U.S. Cl.
  CPC .............. *G10L 21/04* (2013.01); *G10L 25/84* (2013.01); *G10L 2015/025* (2013.01); *G10L 2015/027* (2013.01)

(56) References Cited

U.S. PATENT DOCUMENTS

| | | | | |
|---|---|---|---|---|
| 5,640,490 A * | 6/1997 | Hansen | ................... | G10L 15/02 704/254 |
| 5,749,066 A * | 5/1998 | Nussbaum | ........... | G10L 15/063 704/232 |
| 5,787,387 A * | 7/1998 | Aguilar | ................... | G10L 19/06 704/207 |
| 5,799,276 A * | 8/1998 | Komissarchik | ......... | G10L 15/04 704/207 |
| 5,893,058 A * | 4/1999 | Kosaka | ................... | G10L 15/12 704/254 |
| 6,006,175 A * | 12/1999 | Holzrichter | .......... | A61B 5/0507 704/205 |
| 6,092,039 A * | 7/2000 | Zingher | ................... | G10L 19/00 704/203 |
| 6,233,550 B1 * | 5/2001 | Gersho | ................... | G10L 19/10 704/208 |
| 7,376,556 B2 * | 5/2008 | Bennett | ................... | G06F 17/27 704/215 |
| 8,639,502 B1 * | 1/2014 | Boucheron | ............. | G10L 21/02 381/94.1 |
| 9,620,105 B2 * | 4/2017 | Mason | .................... | G10L 15/02 |
| 9,697,822 B1 * | 7/2017 | Naik | ............................ | G10L 15/063 |
| 2005/0246168 A1 * | 11/2005 | Campbell | ............... | G10L 21/06 704/214 |
| 2012/0253812 A1 | 10/2012 | Kalinli et al. | | |
| 2012/0265534 A1 * | 10/2012 | Coorman | .............. | G10L 13/033 704/265 |
| 2015/0006164 A1 * | 1/2015 | Lu | ........................... | G10L 15/02 704/222 |
| 2015/0073794 A1 | 3/2015 | Kalinli-Akbacak et al. | | |
| 2016/0078863 A1 | 3/2016 | Chung et al. | | |
| 2016/0260426 A1 | 9/2016 | Kim et al. | | |
| 2016/0286309 A1 | 9/2016 | Acharya et al. | | |
| 2016/0365099 A1 * | 12/2016 | Pandey | ............... | G10L 21/0205 |

* cited by examiner

METHOD AND APPARATUS FOR IMPROVING SPONTANEOUS SPEECH RECOGNITION PERFORMANCE

CROSS-REFERENCE TO RELATED APPLICATION

This application claims priority to and the benefit of Korean Patent Application No. 10-2017-0025397, filed on Feb. 27, 2017, the disclosure of which is incorporated herein by reference in its entirety.

BACKGROUND

1. Field

The present invention relates to a method and apparatus for improving spontaneous speech recognition performance, and more particularly, to a method and apparatus for enhancing recognition performance for spontaneous speech having various speaking rates.

2. Discussion of Related Art

Generally, various speaking rates are observed in spontaneous speech. Accordingly, a voice recognizer that has learned voices spoken at appropriate rates has reduced spontaneous speech recognition performance. In order to cope with variation in a speaking rate, there is a method of adjusting a length of a voice suitable for an acoustic model in a characteristic region or a signal region.

For example, there is a cepstrum length normalization method for a characteristic region, and there is a Pitch Synchronous Overlap and Add (PSOLA)-based time scale modification method for a signal region. First, a speaking rate should be measured in order to adjust a variation of a cepstrum length or an overlap factor of the PSOLA.

A speaking rate may be determined by estimating the number of syllables spoken in a certain period of time. A syllable typically includes a syllabic nucleus composed of a vowel. A syllabic nucleus has higher energy and periodicity than an onset and a code such that the energy and periodicity decrease or disappear between two syllabic nuclei while increasing at the syllabic nuclei. Since the energy and periodicity reach their peaks at syllabic nuclei, the syllabic nuclei are detected using the energy and periodicity, and the number of peaks is used as the number of syllables.

In detail, a speaking rate is determined by dividing a voice signal into a plurality of frames, extracting energy-related features (entire band energy, sub-band energy, an envelope correlation, low-band modulation energy, etc.) and periodicity-related features (a pitch, a harmonic component magnitude, etc.) for each of the frames, detecting peaks of the features, and dividing the number of peaks by a voice section length. According to a conventional technique, however, when syllabic nuclei are directly connected such as "fruit," "almost," and "import" or when a sonorant (Korean characters "ㄴ," "ㅁ," "ㄹ," and "ㅇ") is present between syllabic nuclei as an onset and a code, a phenomenon in which energy and periodicity between the syllabic nuclei decrease or disappear and then increase does not occur. Accordingly, it is difficult to detect peaks of energy and periodicity.

A deep neural network, which has been actively studied recently, is a neural network composed of a plurality of hidden layers between an input layer and an output layer and represents a complex relation between an input and an output. In particular, the deep neural network has an advantage capable of precisely representing a relation with an output by utilizing dynamic information between frames of an input signal and extracting characteristics of an implicit input signal. Through this advantage, it is possible to solve a problem of being difficult to detect syllabic nuclei when the syllabic nuclei are connected or when a sonorant is present between the syllabic nuclei.

SUMMARY

Accordingly, the present invention has been devised to solve the aforementioned problems, and the present invention is directed to providing a method and apparatus for improving spontaneous speech recognition performance.

The present invention is also directed to a method for improving spontaneous speech recognition performance by detecting a syllabic nucleus on the basis of a deep neural network and adjusting a length variation or an overlap factor according to a speaking rate. In order to increase performance of the deep neural network, a method of using a phase feature as well as a magnitude feature as an input and using a multi-frame output is provided.

The present invention is also directed to providing a method and apparatus for determining a speaking rate on the basis of a deep neural network and adjusting a length variation or an overlap factor in order to enhance recognition performance for spontaneous speech having various speaking rates. The present invention is also directed to providing a method and apparatus for improving spontaneous speech recognition performance by extracting a phase feature as well as a magnitude feature of a voice signal transformed to the frequency domain, detecting a syllabic nucleus on the basis of a deep neural network using a multi-frame output, determining a speaking rate by dividing the number of syllabic nuclei by a voice section interval detected by a voice detector, calculating a length variation or an overlap factor according to the speaking rate, and performing cepstrum length normalization or time scale modification with a voice length appropriate for an acoustic model.

The present invention is not limited to the above objectives, and other objectives not described herein may be clearly understood by those skilled in the art from the descriptions below.

According to an aspect of the present invention, there is an apparatus for improving spontaneous speech recognition performance, the apparatus including a frequency transformation unit configured to divide a voice signal into a plurality of frames and apply a discrete Fourier transform (DFT) to transform the voice signal from the time domain to the frequency domain; a magnitude feature extraction unit configured to extract a magnitude feature from a magnitude of the voice signal transformed to the frequency domain; a phase feature extraction unit configured to extract a phase feature from a phase of the voice signal transformed to the frequency domain; a syllabic nucleus detection unit configured to detect a syllabic nucleus by using the magnitude feature and the phase feature as an input of a deep neural network; a voice detection unit configured to detect a voice section and a non-voice section from the voice signal; a speaking rate determination unit configured to determine a speaking rate by using the detected syllabic nucleus and an interval of the detected voice section; a calculation unit configured to calculate a degree of time scale modification by using the speaking rate; and a time scale modification unit configured to convert a voice into a length appropriate for an acoustic model by using the degree of time scale modification.

The magnitude feature may include at least one of Mel filter bank log energy (MFLE), a Mel frequency cepstrum coefficient (MFCC), a linear prediction coefficient (LPC), a pitch, a harmonic component, and a spectral flatness.

The phase feature may include at least one of a delta-phase spectrum, a phase distortion deviation, a group delay, and a circular variance.

The degree of time scale modification may be any one of a variation and an overlap factor.

The voice detection unit may model a DFT coefficient distribution of a clean voice and noise as a normal distribution and perform a likelihood ratio test (LRT).

The deep neural network used by the syllabic nucleus detection unit may use a training voice signal and transcription information of the training voice signal, transform the training voice signal to the frequency domain, extract a magnitude feature and a phase feature, configure a phoneme classification item from the transcription information of the training voice signal as a multi-frame output, train the deep neural network to have the magnitude feature and the phase feature as an input and the phoneme classification item configured as the multi-frame output as an output, and train the deep neural network through a back-propagation algorithm by using cross entropy (CE).

The phoneme classification item may include "silent," "consonant," "syllabic nucleus," and "consecutive syllabic nucleus."

The multi-frame output may include performing forced alignment by using the transcription information of the voice signal and the voice recognizer to estimate a voice signal section corresponding to the phoneme classification item, group phoneme classification items of neighboring frames, and output multiple frames.

According to another aspect of the present invention, there is a method for improving spontaneous speech recognition performance, the method including dividing a voice signal into a plurality of frames at predetermined intervals and applying a DFT to transform the voice signal from the time domain to the frequency domain; extracting a magnitude feature from a magnitude of the voice signal transformed to the frequency domain; extracting a phase feature from a phase of the voice signal transformed to the frequency domain; detecting a syllabic nucleus by using the magnitude feature and the phase feature as an input of a deep neural network; detecting a voice section and a non-voice section from the voice signal; determining a speaking rate by using an interval of the detected voice section; calculating a degree of time scale modification by using the speaking rate; and converting a voice into a length appropriate for an acoustic model by using the degree of time scale modification.

The extracting of a magnitude feature may include extracting MFLE, an MFCC, an LPC, a pitch, a harmonic component, and a spectral flatness as the magnitude feature.

The extracting of a phase feature may include extracting a delta-phase spectrum, a phase distortion deviation, a group delay, and a circular variance as the phase feature.

The calculating of a degree of time scale modification may include calculating any one of a variation and an overlap factor as the degree of time scale modification.

The detecting of a voice section and a non-voice section may include modeling a DFT coefficient distribution of a clean voice and noise as a normal distribution and performing an LRT.

The detecting of a syllabic nucleus may include using a training voice signal and transcription information of the training voice signal, transforming the training voice signal to the frequency domain to extract a magnitude feature and a phase feature, configuring a phoneme classification item from the transcription information of the training voice signal as a multi-frame output, training the deep neural network to have the magnitude feature and the phase feature as an input and the phoneme classification item configured as the multi-frame output as an output, and training the deep neural network through a back-propagation algorithm by using CE.

The phoneme classification item may include "silent," "consonant," "syllabic nucleus," and "consecutive syllabic nucleus."

The multi-frame output may indicate performing forced alignment by using the transcription information of the voice signal and the voice recognizer to estimate a voice signal section corresponding to the phoneme classification item, group phoneme classification items of neighboring frames, and output multiple frames.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of accomplishing the same will become apparent with reference to embodiments described below in detail in conjunction with the accompanying drawings. However, the invention may be embodied in different forms and is not to be construed as limited to the embodiments set forth herein. Rather, these embodiments are provided so that this disclosure will be thorough and complete and will fully convey the scope of the present invention to those skilled in the art. Therefore, the scope of the invention is defined only by the appended claims. The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

Figure 1:
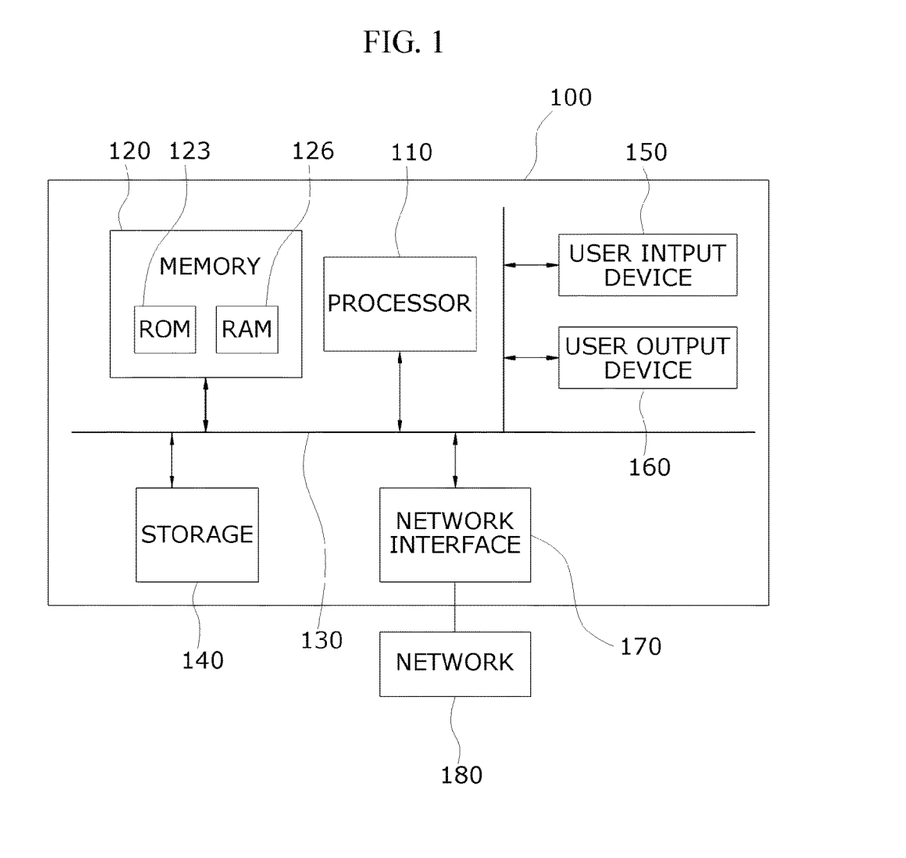
FIG. 1 is an example diagram illustrating a computer system configuration in which a method for improving spontaneous speech recognition performance is implemented according to an embodiment of the present invention.

FIG. 1 is an example diagram illustrating a computer system configuration in which a method for improving spontaneous speech recognition performance is implemented according to an embodiment of the present invention.

The method for improving spontaneous speech recognition performance according to an embodiment of the present invention may be implemented by a computer system or may be recorded in a recording medium. As shown in FIG. 1, the computer system may include at least one or more processors 110, a memory 120, a user input device 150, a data communication bus 130, a user output device 160, and a storage 140. The above-described elements perform data communication through the data communication bus 130.

The computer system may further include a network interface 170 connected to a network 180. The processor 110 may be a central processing unit (CPU) or a semiconductor device that processes instructions stored in the memory 120 and/or the storage 140.

The memory 120 and the storage 140 may include various forms of volatile or non-volatile storage media. For example, the memory 120 may include a read-only memory (ROM) 123 and a random access memory (RAM) 126.

Accordingly, the method of improving spontaneous speech recognition performance according to an embodiment of the present invention may be implemented in a manner executable by a computer. When the method of improving spontaneous speech recognition performance according to an embodiment of the present invention is performed by a computer apparatus, computer readable instructions may perform an operating method according to the present invention.

The method of improving spontaneous speech recognition performance according to an embodiment of the present invention may be implemented as computer-readable codes in a computer-readable recording medium. The computer-readable recording medium includes any kind of recording media for storing data which can be thereafter read by a computer system. Examples of the computer-readable recording medium may include a ROM, a RAM, a magnetic tape, a magnetic disk, a flash memory, an optical data storage device, etc. The computer-readable recording medium can also be distributed over computer systems connected through a computer communication network so that the computer-readable codes are stored and executed in a distributed fashion.

Figure 2:
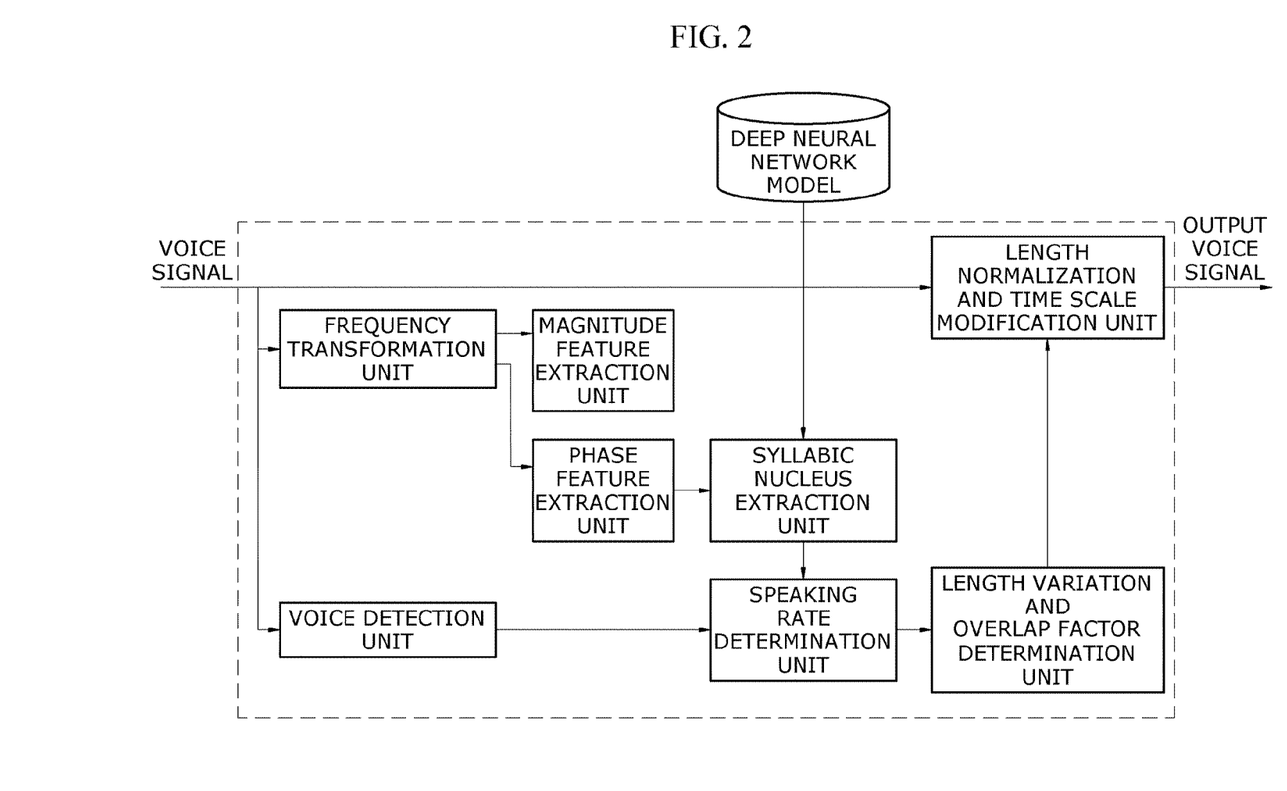
FIG. 2 is a block diagram showing an apparatus for improving spontaneous speech recognition performance according to an embodiment of the present invention.

FIG. 2 is a block diagram showing an apparatus for improving spontaneous speech recognition performance according to an embodiment of the present invention.

Referring to FIG. 2, the apparatus for improving spontaneous speech recognition performance according to the present invention determines a speaking rate on the basis of a deep neural network in order to detect a syllabic nucleus by utilizing dynamic information of voice signals, unlike a conventional technique.

The apparatus for improving spontaneous speech recognition performance according to the present invention includes a frequency transformation unit, a feature extraction unit, a syllabic nucleus detection unit, a voice detection unit, a speaking rate determination unit, a length variation and overlap factor calculation unit, and a length normalization and time scale modification unit.

The frequency transformation unit divides a voice signal into a plurality of frames at predetermined intervals (e.g., 30 ms) and transforms the voice signal from the time domain to the frequency domain by applying a discrete Fourier transform (DFT).

A typical Fourier transform is expressed as the following equation.

$$F(w) = \frac{1}{2\pi} \int_{-\infty}^{\infty} f(t)e^{-iwt} dt. \quad \text{[Equation 1]}$$

The DFT is expressed as the following equation.

$$X_k = \frac{1}{N} \sum_{n=0}^{N-1} x_n e^{-\frac{2\pi i}{N}kn} \ (k \text{ is } 0, 1, \ldots, N-1). \quad \text{[Equation 2]}$$

The DFT may be used for discrete signals to obtain the same effect as the Fourier transform. A fast Fourier transform (FFT) algorithm such as the Cooley-Tukey algorithm, the prime-factor algorithm, Brune's algorithm, radar algorithms, or Bluestein's algorithm may be used to process the DFT.

The feature extraction unit includes a magnitude feature extraction unit and a phase feature extraction unit.

The magnitude feature extraction unit extracts information such as Mel filter bank log energy (MFLE), a Mel frequency cepstrum coefficient (MFCC), a linear prediction coefficient (LPC), a pitch, a harmonic component, a spectral flatness, etc. from a magnitude of the voice signal transformed to the frequency domain.

The phase feature extraction unit extracts features from a phase of the voice signal transformed to the frequency domain. The phase of the voice signal cannot explicitly show direction and accessible information, and thus is generally not used in the field of voice signal processing. However, when analysis is performed through a deep neural network, implicit information of an input signal may be extracted. Accordingly, according to the present invention, a phase feature is used together with a magnitude feature.

The extracted phase feature includes a delta-phase spectrum, a phase distortion deviation, a group delay, and a circular variance.

The syllabic nucleus detection unit detects a syllabic nucleus by using the magnitude feature and the phase feature as an input of the deep neural network. Here, the deep neural network is acquired in advance from a training voice signal.

The voice detection unit detects a voice section and a non-voice section from an input voice signal. For example, the voice section is detected by modeling a DFT coefficient distribution of a clean voice and noise as a normal distribution and performing a likelihood ratio test (LRT).

The speaking rate determination unit uses the number of syllables (fram_count) of detected syllabic nuclei and divides the number of syllables by an interval of the voice section (speech_interval) detected by the voice detection unit to determine a speaking rate. The speaking rate may be measured only when there is a voice section having a certain length on the basis of the assumption that a syllabic interval is constant.

$$\text{rate} = \frac{\text{fram\_count}}{\text{speech\_interval}}. \quad \text{[Equation 3]}$$

The length variation and overlap factor calculation unit calculates a length variation and an overlap factor that indicate a degree of time scale modification by using the speaking rate. For example, an overlap factor of a Pitch Synchronous Overlap and Add (PSOLA) may be linearly adjusted as follows.

$$\text{factor} = \text{MIN}(\text{MAX}(\beta*(\text{rate}-\gamma)+1.0,1.0),1.5) \quad \text{[Equation 4]}$$

In this case, since performance of a recognizer of spontaneous speech spoken at slow rate does not significantly decrease, time scale modification is not applied. Also, when a PSOLA technique is applied using an overlap factor outside a certain range, an unnatural synthesized sound is obtained, and thus recognition performance is deteriorated. Accordingly, the maximum overlap factor is limited to 1.5.

The length normalization and time scale modification unit may perform cepstrum length normalization or time scale modification by using a voice length appropriate for an acoustic model by using the length variation or the overlap factor. For example, an existing PSOLA-based time scale modification is used. A pitch change doesn't occur in the PSOLA technique because peak intervals of a signal synthesized with an algorithm for adding voice segments obtained by analyzing voice in units of a pitch to overlap each other are constant.

Figure 3:
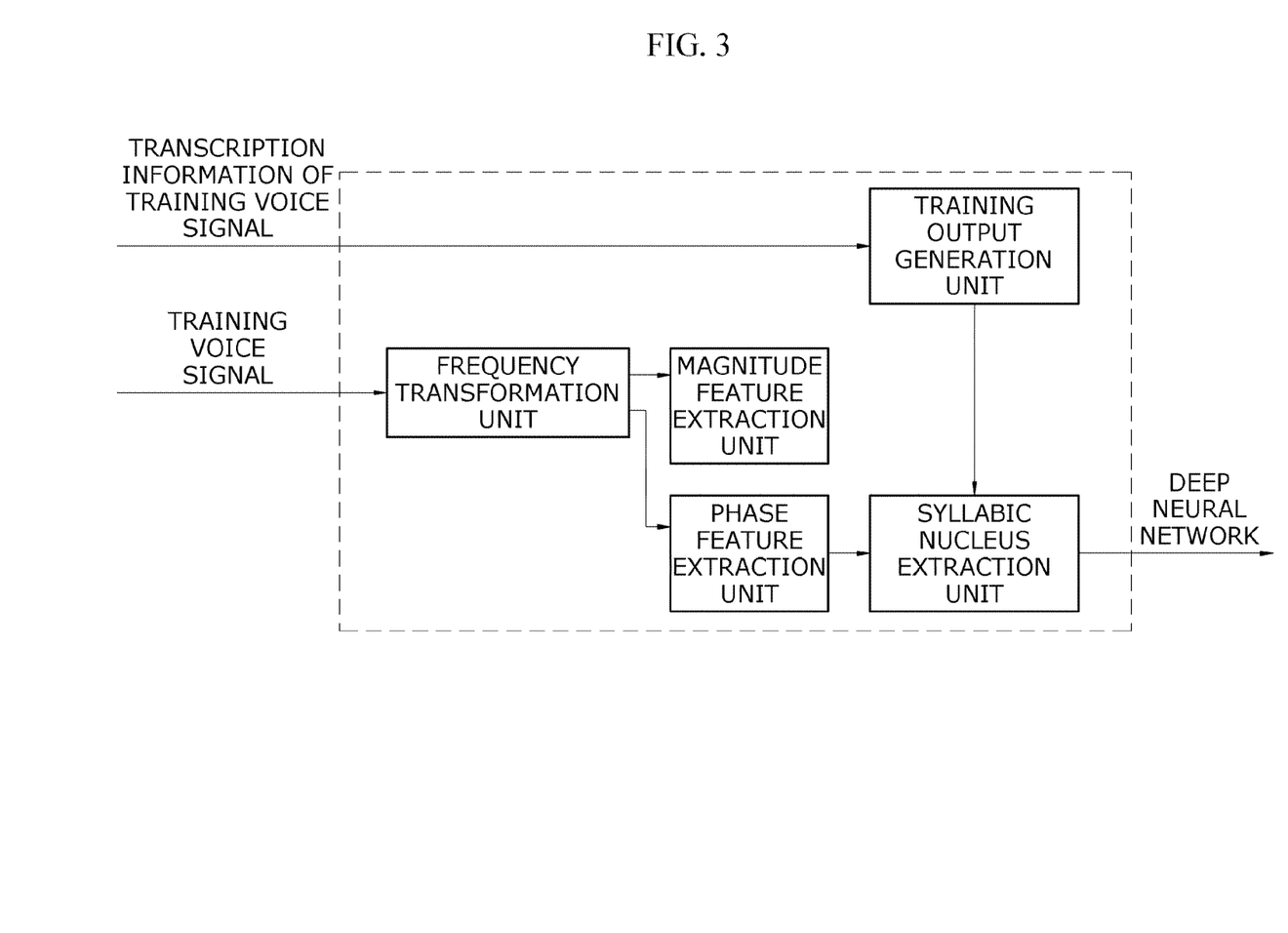
FIG. 3 is a block diagram showing an apparatus for training a deep neural network using a training voice signal according to an embodiment of the present invention.

FIG. 3 is a block diagram showing an apparatus for training a deep neural network from a training voice signal according to an embodiment of the present invention.

A frequency transformation unit transforms a training voice signal into the frequency domain.

A feature extraction unit extracts a magnitude feature and a phase feature from the transformed training voice signal. A training output generation unit generates an output to be used in a deep neural network from transcription information of the training voice signal. A phoneme acquired from the transcription information of the training voice signal is classified into four types "silent," "consonant," "syllabic nucleus," and "consecutive syllabic nucleus." Numbers "1," "2," "3," and "4" are assigned to classification items of the types and are used as inputs of the deep neural network model. However, this is merely an example, and the present invention is not limited to a specific classification type and classification method.

For example, a TIMIT training voice database that is widely used in the field of voice recognition has 61 phonemes based on pronunciation, and the phonemes are classified into "silent," "consonant," "syllabic nucleus," and "consecutive syllabic nucleus" as follows.

TABLE 1

| Output | Classification | Phoneme |
|---|---|---|
| 1 | Silent | h#, epi, pau |
| 2 | Consonant | jh, ch, b, d, g, p, t, k, dx, s, sh, z, zh, f, th, v, dh, m, n, nx, ng, l, r, w, y, hh, hv, q, bcl, dcl, gcl, pcl, tcl, kcl |
| 3 | Syllabic nucleus | ae, aa, ah, eh, iy, ih, uh, uw, aw, ay, ey, oy, ow, ao, ax, ax-h, ix, ux, er, axr, el, em, en, eng |

When there are consecutive syllabic nuclei, the following syllabic nucleus is set as a "consecutive syllabic nucleus." A phoneme acquired from the transcription information of the training voice signal is classified using Table 1, and a classification item number is an output of a featured extracted from a voice section corresponding to the phoneme. However, since the transcription information of the training voice signal does not have time information corresponding to the phoneme, forced alignment is performed with a Gaussian Mixture Model-Hidden Markov Model (GMM-HMM)-based voice recognizer to estimate a voice signal section corresponding to the phoneme. In this case, as accuracy of the forced alignment increases, the performance increases. Since a training voice signal acquired in a noisy environment has reduced state forced-alignment accuracy, a noise processing process is performed, and then forced alignment is performed by the GMM-HMM-based voice recognizer. In this case, a multi-frame output may be used by grouping outputs of neighboring frames so that the output is well trained in a transition section from a "syllabic nucleus" to a "consecutive syllabic nucleus." The syllabic nucleus detection model training unit uses the magnitude feature and the phase feature as an input and also the phoneme classification item number as an output to apply the deep neural network model.

The syllabic nucleus detection model training unit performs training by applying a back-propagation algorithm using cross entropy (CE), to which the deep neural network model for detecting a syllabic nucleus is applied, as a reference value.

Figure 4:
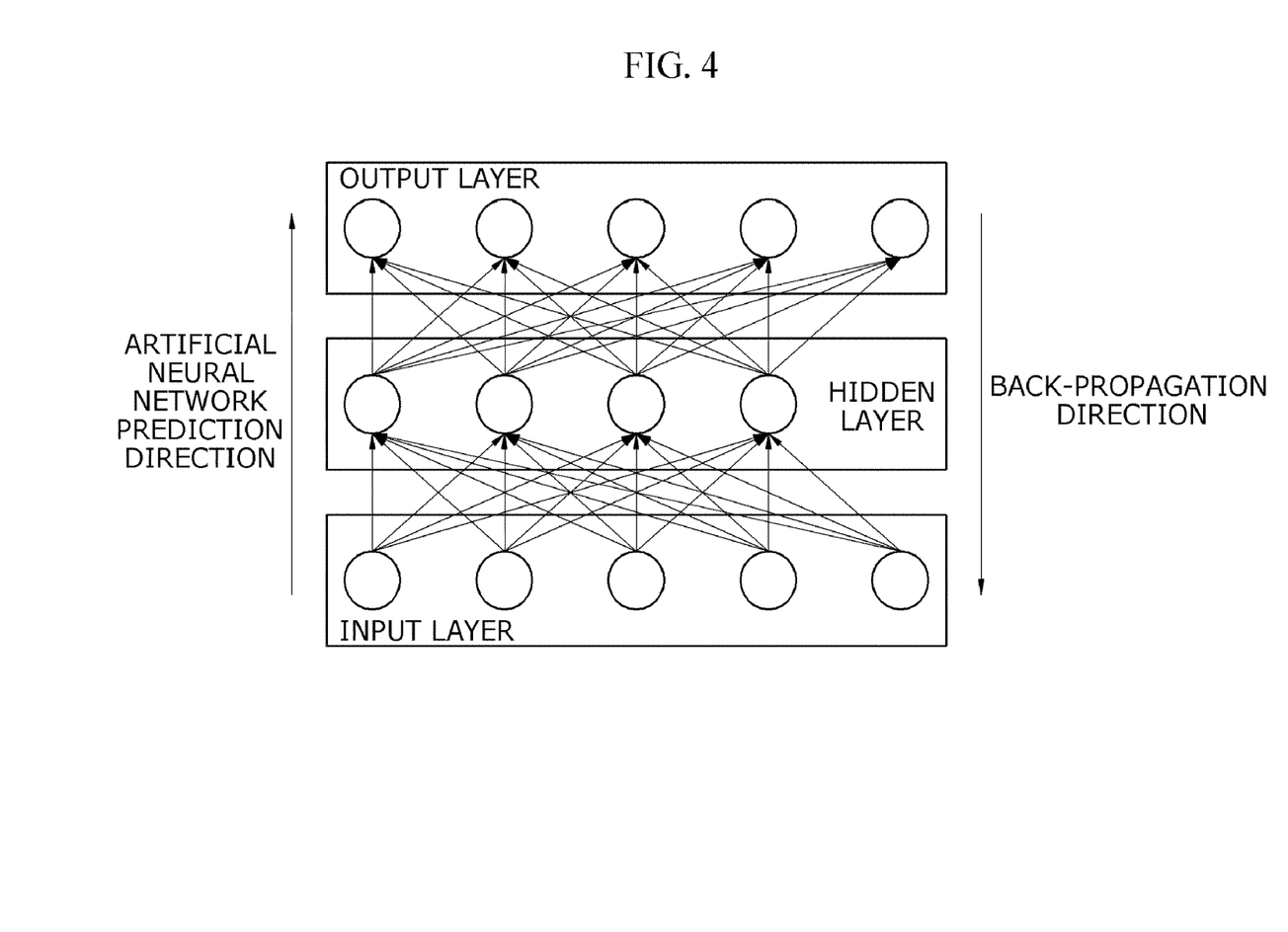
FIG. 4 is an example diagram illustrating a method of predicting an artificial neural network.

FIG. 4 is an example diagram illustrating a method of predicting an artificial neural network.

The artificial neural network includes an input layer composed of initial input data and an output layer composed of final output data, and also includes a hidden layer as an intermediate layer for yielding output data from the input data. There are a plurality of hidden layers, and an artificial neural network including two or more hidden layers is called a deep neural network. Actual calculation may be performed at a node present in each of the layers, and each of the nodes may perform the calculation on the basis of output values of other nodes connected thereto by a connection line.

As shown in FIG. 4, in principle, pieces of input data or nodes in the same layer do not affect each other. Each layer sends and receives data to and from only a node of an upper or lower adjacent layer as an input value or an output value.

In FIG. 4, all nodes of adjacent layers are connected through a connection line. However, if necessary, there may be no connection line between nodes belonging to adjacent layers. However, when there is no connection line, it is possible to set a weight of a corresponding input value to be zero and perform processing.

When an output value of an output layer is predicted from the output layer according to a prediction direction of the artificial neural network, an input value may be predicted from output values during a learning process. In a typical artificial neural network, there is no one-to-one correspondence between the input value and the output value, and thus it is impossible to recover the input layer without change from the output layer. However, when input data calculated from a result value by a back-propagation algorithm in consideration of a prediction algorithm is different form the initial input data, prediction of the artificial neural network may be considered to be inaccurate, and it is possible to change prediction coefficients and train the learning so that input data calculated under constraint conditions becomes similar to the initial input data.

Figure 5:
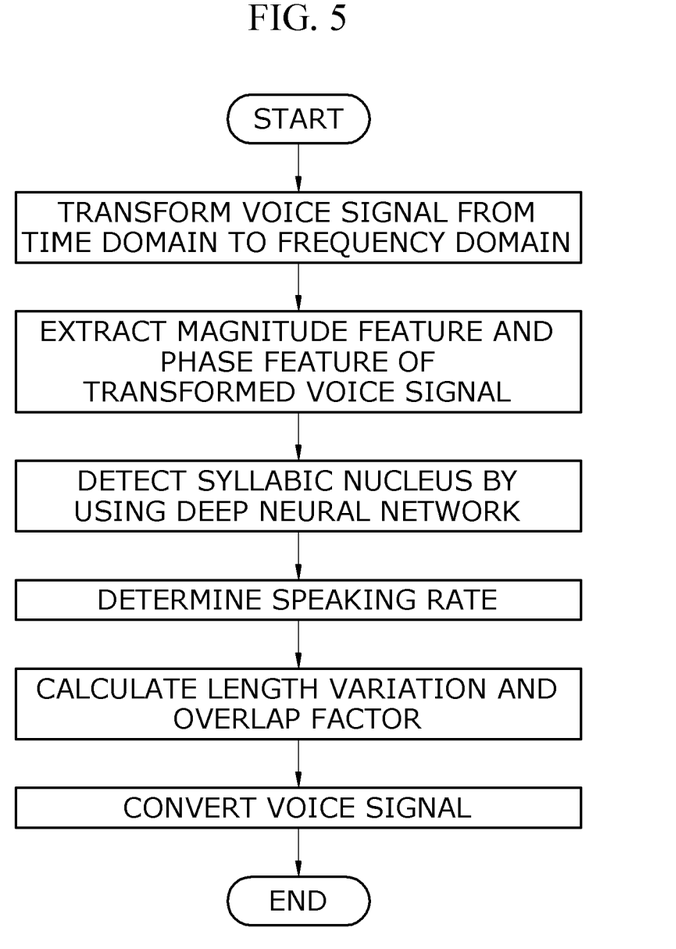
FIG. 5 is a flowchart showing a method for improving spontaneous speech recognition performance according to an embodiment of the present invention.

FIG. 5 is a flowchart showing a method for improving spontaneous speech recognition performance according to an embodiment of the present invention.

Referring to FIG. 5, the method for improving spontaneous speech recognition performance includes steps of: (a) dividing a voice signal into a plurality of frames at predetermined intervals and applying a DFT to transform the voice signal from the time domain to the frequency domain; (b) extracting a magnitude feature from a magnitude of the voice signal transformed to the frequency domain; (c) extracting a phase feature from a phase of the voice signal transformed to the frequency domain; (d) detecting a syllabic nucleus by using the magnitude feature and the phase feature as an input of a deep neural network; (e) modeling a DFT coefficient distribution of a clean voice and noise as a normal distribution and performing a LRT to detect a voice section; (f) determining a speaking rate by using an interval of the detected voice section; (g) calculating a degree of time scale modification by using the speaking rate; and (h) converting the voice into a length appropriate for an acoustic model by using the degree of time scale modification.

The magnitude feature includes at least one of MFLE, an MFCC, an LPC, a pitch, a harmonic component, and a spectral flatness.

The phase feature includes at least one of delta-phase spectrum, phase distortion deviation, group delay, and circular variance.

Figure 6:
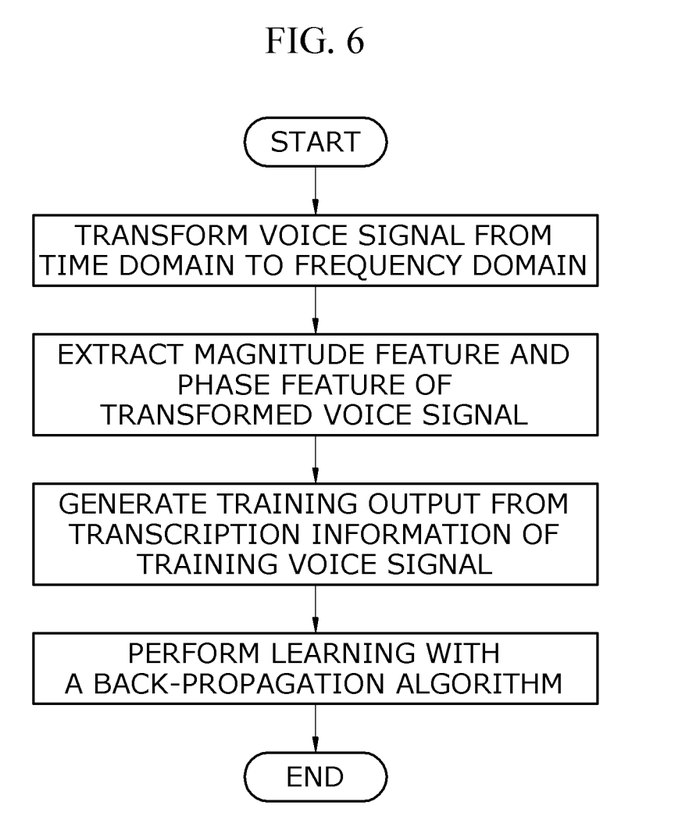
FIG. 6 is a flowchart showing a method of training a deep neural network using a training voice signal according to an embodiment of the present invention.

The degree of time scale modification is any one of a variation and an overlap factor. FIG. 6 is a flowchart showing a method of training a deep neural network from a training voice signal according to an embodiment of the present invention.

Referring to FIG. 6, the method of training a deep neural network includes steps of: (a) transforming a training voice signal to the frequency domain; (b) extracting a magnitude feature and a phase feature from the transformed training voice signal; (c) classifying a phoneme acquired from transcription information of the training voice signal into any one of "silent," "consonant," "syllabic nucleus," and "consecutive syllabic nucleus" and generating an output to be used in the deep neural network; and (d) training the deep neural network to have the magnitude feature and the phase feature as an input and the phoneme classification item as an output through a back-propagation algorithm by using CE as a reference value.

Preferably, step (c) may further include performing forced alignment with a GMM-HMM-based voice recognizer to estimate a voice signal section corresponding to the phoneme when the transcription information of the training voice signal does not have time information corresponding to the phoneme.

Preferably, step (c) may further include using a multi-frame output by grouping outputs of neighboring frames so that the output is well trained in a transition section from a "syllabic nucleus" to a "consecutive syllabic nucleus."

Preferably, serial numbers (e.g., 1, 2, 3, and 4) may be assigned to the "silent," "consonant," "syllabic nucleus," and "consecutive syllabic nucleus" used as the output. According to the present invention, it is possible to improve recognition performance for spontaneous speech having various speaking rates by determining a speaking rate by using a deep neural network and adjusting a length variation or an overlap factor. It is also possible to effectively detect a syllabic nucleus even when syllabic nuclei are consecutive or a sonant is present between syllabic nuclei by using a phase feature as well as a magnitude feature as an input and using a multi-frame output while a syllabic nucleus is detected on the basis of a deep neural network. According to the present invention, it is possible to increase accuracy of a determination of the speaking rate. Also, the present invention is effective in detecting a lengthening by measuring an interval between syllabic nuclei.

While the configuration of the present invention has been particularly shown and described with reference to the appending drawings and preferred embodiments, it should be understood by those of ordinary skill in the art that various changes in form and details may be made therein without departing from the spirit and scope of the present invention.

Accordingly, the scope of the present invention is not limited to the above-described embodiments and is to be determined only by the appended claims.

What is claimed is:

1. An apparatus for improving spontaneous speech recognition performance, the apparatus comprising a computer including a processor and memory, the processor comprising:
a frequency transformer that divides a voice signal into frames and applies a discrete Fourier transform (DFT) to transform the voice signal from the time domain to the frequency domain;
a magnitude feature extractor that extracts a magnitude feature from a magnitude of the voice signal transformed to the frequency domain;
a phase feature extractor that extracts a phase feature from a phase of the voice signal transformed to the frequency domain;
a syllabic nucleus detector that detects a syllabic nucleus by using the magnitude feature and the phase feature as an input of a deep neural network;
a voice detector that detects a voice section and a non-voice section from the voice signal;
a speaking rate determiner that determines a speaking rate by using the detected syllabic nucleus and an interval of the detected voice section;
a calculator that calculates a degree of time scale modification by using the speaking rate; and
a time scale modifier that converts a voice into a length appropriate for an acoustic model by using the degree of time scale modification,
and the deep neural network of the computer detects a syllabic nucleus from the syllabic nucleus detector and outputs a phoneme classification item as a multi-frame output.

2. The apparatus of claim 1, wherein the magnitude feature includes at least one of Mel filter bank log energy (MFLE), a Mel frequency cepstrum coefficient (MFCC), a linear prediction coefficient (LPC), a pitch, a harmonic component, and a spectral flatness.

3. The apparatus of claim 1, wherein the phase feature includes at least one of a delta-phase spectrum, a phase distortion deviation, a group delay, and a circular variance.

4. The apparatus of claim 1, wherein the degree of time scale modification is any one of a variation and an overlap factor.

5. The apparatus of claim 1, wherein the voice detector models a DFT coefficient distribution of a clean voice and noise as a normal distribution and performs a likelihood ratio test (LRT).

6. The apparatus of claim 1, wherein the deep neural network used by the syllabic nucleus detector uses a training voice signal and transcription information of the training voice signal, transforms the training voice signal to the frequency domain, extracts a magnitude feature and a phase feature, configures the phoneme classification item from the transcription information of the training voice signal as a multi-frame output, trains the deep neural network to have the magnitude feature and the phase feature as an input and the phoneme classification item configured as the multi-frame output as an output, and trains the deep neural network through a back-propagation algorithm by using cross entropy (CE).

7. The apparatus of claim 6, wherein the phoneme classification item includes "silent," "consonant," "syllabic nucleus," and "consecutive syllabic nucleus".

8. The apparatus of claim 6, wherein the multi-frame output includes performing forced alignment by using the transcription information of the voice signal and the voice recognizer to estimate a voice signal section corresponding to the phoneme classification item, group phoneme classification items of neighboring frames, and output multiple frames.

9. A computer implemented method for improving spontaneous speech recognition performance, the computer including a processor and a memory, the computer implemented method comprising:
dividing a voice signal into a plurality of frames at predetermined intervals and applying a discrete Fourier transform (DFT) to transform the voice signal from the time domain to the frequency domain;
extracting a magnitude feature from a magnitude of the voice signal transformed to the frequency domain;
extracting a phase feature from a phase of the voice signal transformed to the frequency domain;
detecting a syllabic nucleus by using the magnitude feature and the phase feature as an input of a deep neural network;
detecting a voice section and a non-voice section from the voice signal;
determining a speaking rate by using an interval of the detected voice section;
calculating a degree of time scale modification by using the speaking rate;
converting a voice into a length appropriate for an acoustic model by using the degree of time scale modification; and
detecting, by the deep neural network of the computer, a syllabic nucleus and outputting a phoneme classification item as a multi-frame output.

10. The method of claim 9, wherein the extracting of a magnitude feature comprises extracting Mel filter bank log energy (MFLE), a Mel frequency cepstrum coefficient (MFCC), a linear prediction coefficient (LPC), a pitch, a harmonic component, and a spectral flatness as the magnitude feature.

11. The method of claim 9, wherein the extracting of a phase feature comprises extracting a delta-phase spectrum, a phase distortion deviation, a group delay, and a circular variance as the phase feature.

12. The method of claim 9, wherein the calculating of a degree of time scale modification comprises calculating any one of a variation and an overlap factor as the degree of time scale modification.

13. The method of claim 9, wherein the detecting of a voice section and a non-voice section comprises modeling a DFT coefficient distribution of a clean voice and noise as a normal distribution and performing a likelihood ratio test (LRT).

14. The method of claim 9, wherein the detecting of a syllabic nucleus comprises using a training voice signal and transcription information of the training voice signal, transforming the training voice signal to the frequency domain to extract a magnitude feature and a phase feature, configuring the phoneme classification item from the transcription information of the training voice signal as a multi-frame output, training the deep neural network to have the magnitude feature and the phase feature as an input and the phoneme classification item configured as the multi-frame output as an output, and training the deep neural network through a back-propagation algorithm by using cross entropy (CE).

15. The method of claim 14, wherein the phoneme classification item includes "silent," "consonant," "syllabic nucleus," and "consecutive syllabic nucleus".

16. The method of claim 14, wherein the multi-frame output indicates performing forced alignment by using the transcription information of the voice signal and the voice recognizer to estimate a voice signal section corresponding to the phoneme classification item, group phoneme classification items of neighboring frames, and output multiple frames.

* * * * *